United States Patent

[11] 3,609,418

| [72] | Inventor | Edward Halas<br>P.O. Box 2682, Detroit, Mich. 48231 |
|---|---|---|
| [21] | Appl. No. | 862,195 |
| [22] | Filed | Sept. 30, 1969 |
| [45] | Patented | Sept. 28, 1971<br>Continuation-in-part of application Ser. No. 492,110, Oct. 1, 1965, now Patent No. 3,521,091 |

[54] MECHANICAL POWER TRANSMISSION SYSTEMS
22 Claims, 33 Drawing Figs.

[52] U.S. Cl. .................................................. 310/10, 310/93, 310/105, 310/102
[51] Int. Cl. ...................................................... H02k 9/197, H02k 49/04, H02k 51/00
[50] Field of Search .......................................... 310/10, 54, 93, 105, 102

[56] References Cited
UNITED STATES PATENTS

| 859,545 | 7/1907 | Collins | 310/102 |
|---|---|---|---|
| 1,196,713 | 8/1916 | Nelson | 310/102 X |
| 2,490,531 | 12/1949 | Martin | 310/93 |
| 2,791,308 | 5/1957 | Barrett et al. | 310/93 X |
| 3,320,443 | 5/1967 | Klein | 310/11 |
| 3,368,087 | 2/1968 | Madsen | 310/10 |

Primary Examiner—D. X. Sliney
Attorney—Mason, Mason and Albright

ABSTRACT: A foil strip-type conductor for producing a magnetic field which is immersed in a fluid such as liquid nitrogen or helium cooled to cryogenic temperatures, the liquid being in moving contact with each strip of the conductor. A power transmission system having primary means for producing a magnetic field which is a superconductive foil coil immersed in a liquid coolant such as helium and secondary means responsive to the magnetic field which is maintained at cryogenic but not necessarily a superconductive temperature by a liquid coolant such as nitrogen and which rotates within an enclosure containing such coolant.

INVENTOR
EDWARD HALAS

INVENTOR
EDWARD HALAS

INVENTOR
EDWARD HALAS

INVENTOR
EDWARD HALAS

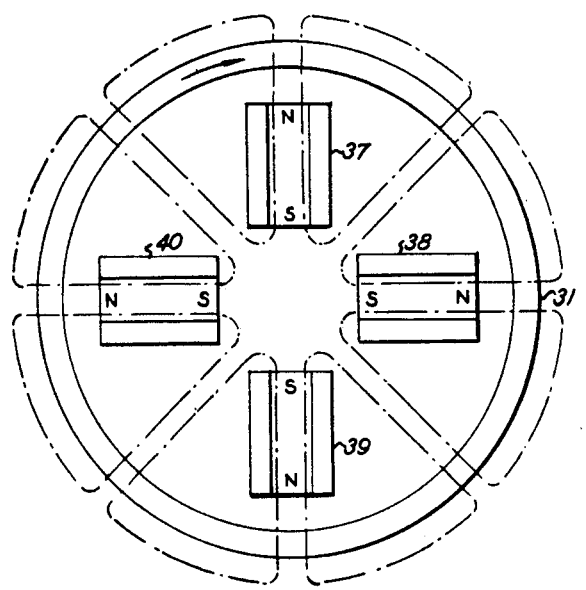
FIG. 11
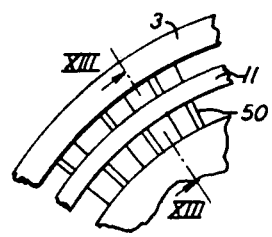
FIG. 12
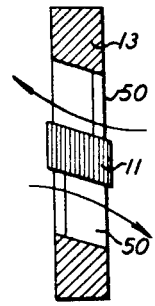
FIG. 13
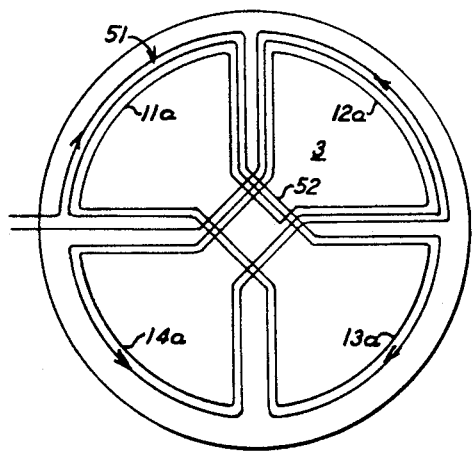
FIG. 14
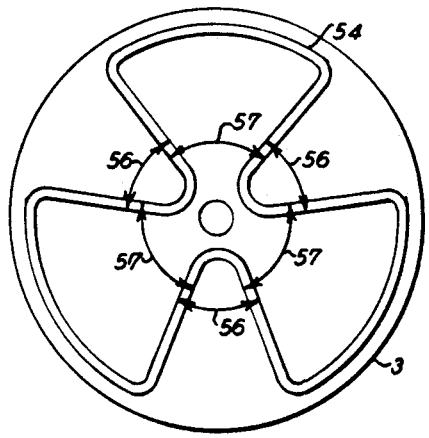
FIG. 16
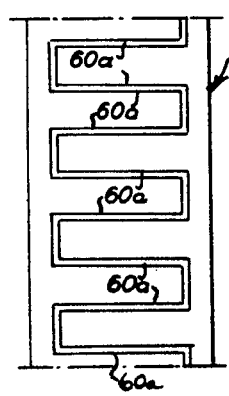
FIG. 17
FIG. 15
INVENTOR
EDWARD HALAS
BY Mason, Mason & Albright
ATTORNEYS

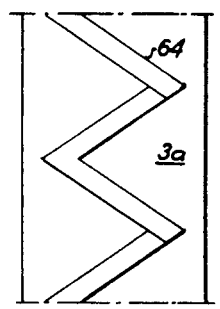
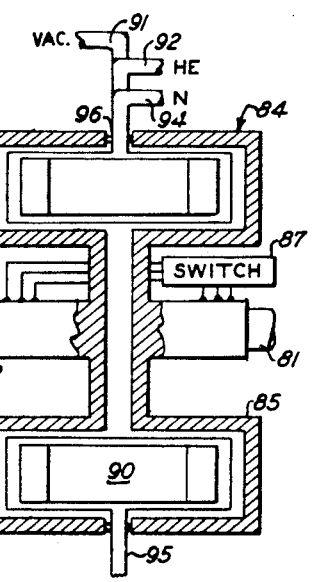
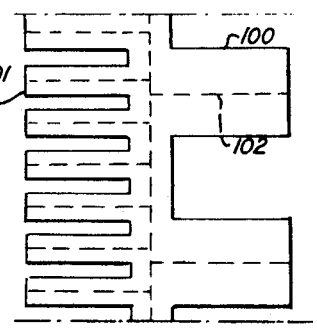
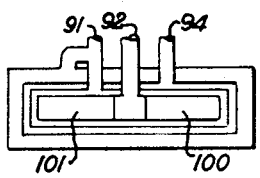
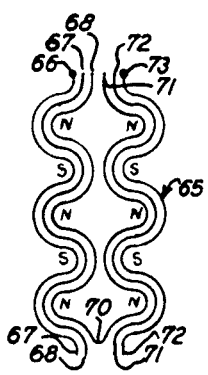
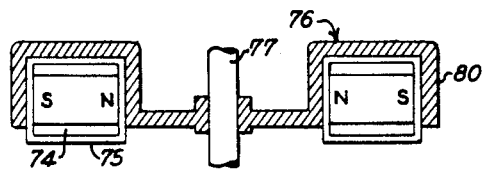
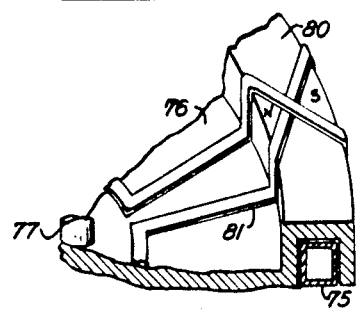
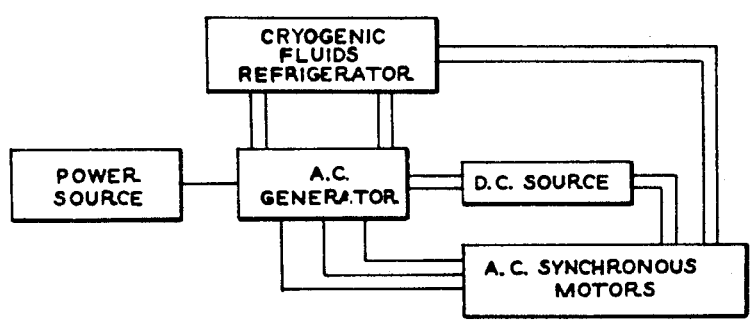
INVENTOR
EDWARD HALAS

INVENTOR
EDWARD HALAS

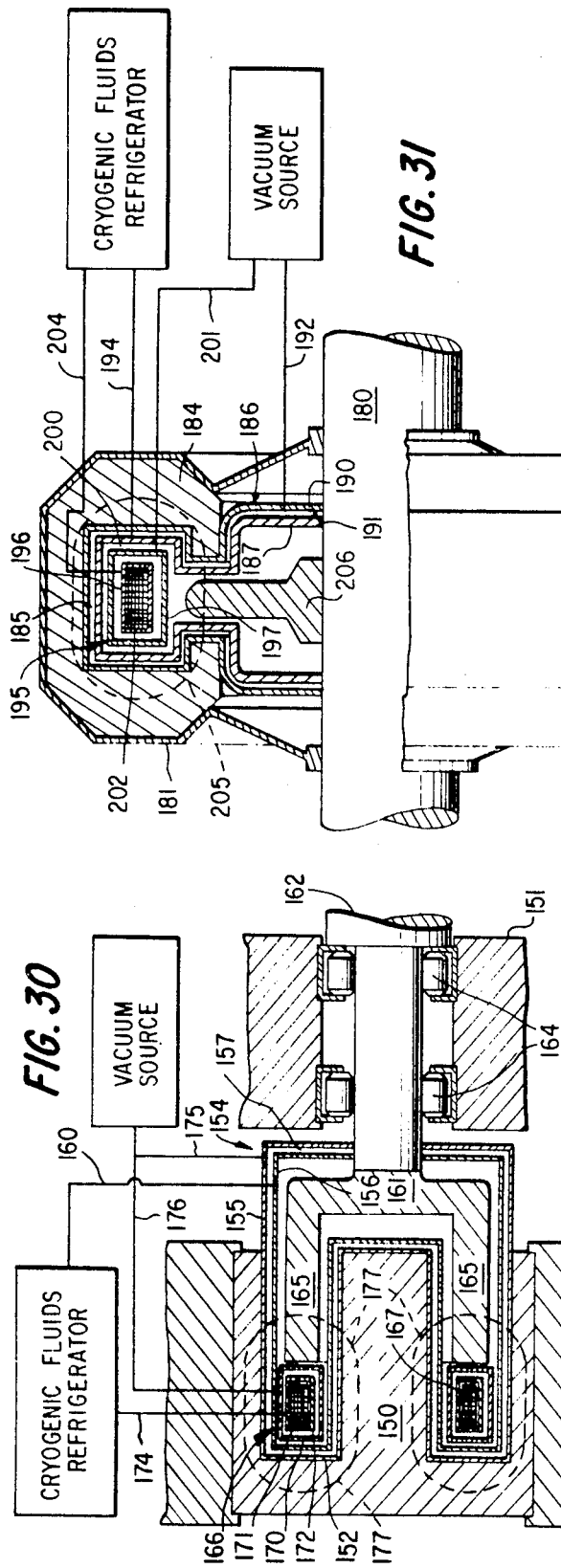
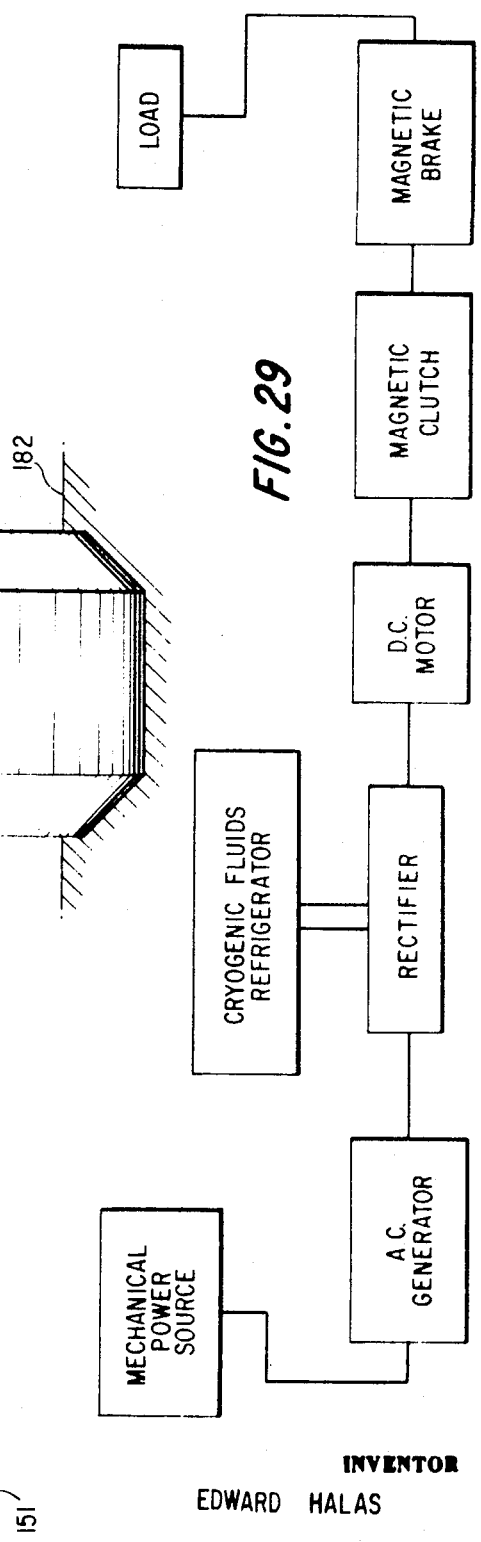
FIG. 31
FIG. 30
FIG. 29
INVENTOR
EDWARD HALAS
BY Mason, Mason & Albright
ATTORNEYS

MECHANICAL POWER TRANSMISSION SYSTEMS

CROSS-REFERENCES TO RELATED APPLICATIONS

This is a continuation-in-part application of my copending application Ser. No. 492,110, filed Oct. 1, 1965 now U.S. Pat. No. 3,521,091, patented July 21, 1970.

BACKGROUND AND OBJECTS OF THE INVENTION

It is known that conventional generators and motors utilizing normal temperature electrical conductors and magnetic flux carrying materials are in a high state of development and are in everyday application.

For many years it has been the dream of inventors to bring about improvements in electrical apparatus through the use of superconducting coils and superconducting current magnetic fields. However, numerous obstacles have deterred the development of superconducting apparatus for useful application, and the quest for workable superconducting apparatus has been a source of great discouragement and frustration for electrical manufacturers.

More than 50 years have elapsed since the first reference was made to the utilization of superconducting coils in electrical apparatus and in that period of time there have been many failures. It was reported in 1915 in the *Scientific American* magazine that the most significant scientific event of 1914 was the discovery by Professor Onnes that when certain metals are cooled to absolute zero, they cease to have any measurable electrical resistance and that a current started in a coil which is cooled to cryogenic temperatures will continue without any appreciable reduction in magnitude. It was considered unlikely at that time that the discovery would have any commercial application in the field of electrical engineering. At the same time, however, it was noted that all electrical machinery could be traced to such seemingly impractical experiments from a commercial point of view.

Many problems exist in achieving superconducting apparatus. For example: the fabrication of superconducting materials into suitable coils, the construction of the coil to withstand the high mechanical forces resulting from the circulating electrical currents, the winding of the coil to protect it from electrical transients and changing magnetic fields, the most efficient cooling of the superconducting coil to preserve the superconducting properties, etc.

As has been mentioned, there has been a desire for many years for superconducting apparatus which would possess more utility than conventional room temperature apparatus. But, the problems involved in originating practical embodiments have been difficult of solutions since the behavior of superconducting coils are frequently not predictable. For solutions, careful attention must be given to much empirical detail.

With modern technology, the most useful electrical apparatus is that which develops or makes use of an alternating frequency current. The condition of being able to handle alternating frequency currents, however, imposes a heavy burden on superconducting devices because superconductors are inherently direct-current devices. Alternating currents of even very low frequencies affect superconducting coils adversely. It therefore becomes necessary to incorporate damping circuits into the superconducting coils, by increasing the distributed capacitance through winding techniques such as winding two strips together and electrically connecting the end of one strip to the beginning of the other to give a continuous circuit. There are other ways of producing damping, such as pure metal coatings, but only those methods are preferred which will keep the dimensions of the coil to a minimum size in volume and produce highest efficiency.

There are further problems in that although it may be desirable that the alternating current apparatus be completely superconducting, this is considered impractical in the present state of the art. The alternating current armature is not adaptable to the use of superconductors although certain advantages of efficiency and higher power densities would otherwise be obtainable from the use of superconductors in the magnetic field. The reason for this is that superconductors possess zero resistance and permit high current densities if the current is a direct current. However, with an alternating current, the superconductors develop resistivity which is a function of frequency. Also, heating effect resulting from the $I^2R$ loss thus produced impairs the properties of superconductors.

Superconductors passing through a magnetic field generate within themselves a large current and a very low voltage. In conventional generators, a voltage is generated across the armature windings. Power at such voltages is transmitted over long distances through the use of voltage changing transformers. This is the major advantage of alternating current over direct current. While a complete superconducting generator with both field and armature windings in a superconduction state is possible to achieve, it presents a serious problem in that the power generated if of exceedingly low voltage and very high amperage. This in turn creates difficult transformer problems for power transmission. It is thus a capability of this invention to produce electrical power with sufficiently high voltage differentials adequate for conventional power transmission.

Difficult problems exist also relative to cooling the rotating superconducting apparatus. In this connection, it is to be understood that it is possible to rotate either a superconducting field or superconducting armature. But, in either event, it is difficult to cool the rotating superconducting member. The reason is that the superconductors must be immersed in fluid helium at cryogenic temperatures to possess superconducting properties. Liquid helium, however, has a tendency to vaporize easily in the influence of rotating bodies. It thus becomes significantly more difficult to cool the rotating body efficiently or adequately. For such reasons the preferred superconducting member of my invention is one which uses a superconducting magnetic field that is stationary and a rotating alternating current armature which uses conductors not superconducting. It is a further object of this invention to provide a superior superconducting magnetic field design for combination with an armature which is not necessarily superconducting.

A problem also exists because of the centrifugal forces stressing the conductors on the rotating member. Where conventional wire conductors are used, the problem of electrical insulation cut through occurs with centrifugal forces pressing on small contact areas to crush the insulation so that a short circuit results. By using foil strips conductors it is possible to provide large load bearing areas so that cut through is greatly minimized. In addition, by using aluminum foil conductors which have a low weight per current carrying capacity, the stress problems are further reduced. Accordingly, a still further advantage of the invention lies in the use of foil strips in the superconducting apparatus.

The armature conductors must be effectively cooled to reduce $I^2R$ losses. It is well known that conventional conductors have nonuniform heat distribution with hot spots developing in the windings. By using foil conductors, in accordance with the invention, improved heat transfer characteristics, in addition to the other advantages, are achieved.

It is possible to obtain strong magnetic fields more efficiently with superconductors than it is with normal conductors. This results in a more efficient process for generating electric power than was previously possible, since the power generated is proportional to the square of the flux density expressed in mathematical terms.

Since it is possible to obtain strong fields efficiently by the use of superconductors without the attendant power losses, it is not necessary to use magnetic flux materials such as iron where the flux density exceeds the saturation limits of the materials. Elimination of magnetic materials is beneficial since it reduces the weight of electrical apparatus. In addition, the waveform of the armature voltage is improved by eliminating unwanted effects due to material saturation which tend to distort voltage waveforms.

3,609,418

There are advantages to be gained by generating a higher frequency at a lower rotational speed. This invention includes a technique for doubling the frequency by utilizing a new construction which effectively doubles the number of poles. The results obtained through this technique are a still further object of the invention.

Other objects, adaptabilities and capabilities will appear as the description progresses, reference being had to the accompanying drawings, in which:

BRIEF DESCRIPTION OF THE DRAWINGS

FIG. 11 is a view of an apparatus similar to FIG. 10, but with the cylindrical rotor on the outside of the field windings;

FIG. 12 is a fragmentary view of the armature windings on a disc with the windings disposed between cooling vanes;

FIG. 13 is a fragmentary sectional view taken on lines XIII—XIII of FIG. 12;

FIG. 14 is a representation similar to FIG. 1 showing an alternative method of winding an armature phase;

FIG. 15 is a fragmentary detail showing a method of crossing the foil strips of the windings shown in FIG. 14;

FIG. 16 is a schematic representation of a further embodiment of an armature phase;

FIG. 17 is a schematic representation of a still further embodiment of an armature phase as may be applied to a cylinder;

FIG. 18 is a fragmentary detail showing a method of bending the foil strips of the windings shown in FIG. 17;

FIG. 19 is a schematic representation of an alternative winding for an armature phase on a cylinder;

FIG. 20 is a schematic representation of field windings comparable to FIG. 4;

FIG. 21 is a diagrammatic sectional view of a field acting with both poles on an armature contained in a half-torus-shaped portion;

FIG. 22 is a fragmentary perspective view of the apparatus shown in FIG. 21 illustrating the configuration of the armature strips;

FIG. 23 is a diagrammatic sectional view of a power conversion unit in accordance with the invention;

FIG. 24 is a diagrammatic sectional view showing a method of maintaining the field coils of FIG. 23 at superconducting temperatures;

FIG. 25 is a schematic representation of a phase of the armature coils of the unit shown in FIG. 23;

FIG. 26 is a schematic representation of a power plant system utilizing the apparatus of the invention;

FIG. 29 is a schematic representation of a still further power plant utilizing the invention;

FIG. 30 is a diagrammatic sectional view of a magnetic brake having a superconductive magnetic field producing coil;

FIG. 31 is a diagrammatic sectional view of a further magnetic brake which has a magnetic field produced by a superconductive coil;

DESCRIPTION OF THE PREFERRED EMBODIMENTS

The electrical apparatus with a normal armature and a superconducting field is the preferred embodiment. It is, however, advantageous to cool the rotating armature by means of cryogenic fluids, other than liquid helium, which possess efficient heat vaporization properties. Examples of preferred fluids are liquid nitrogen, liquid oxygen, liquid hydrogen at reduced pressures, liquid argon, or others that possess surface tensions in the order of 0.3 to 50 dynes/cm.

Figure 1:
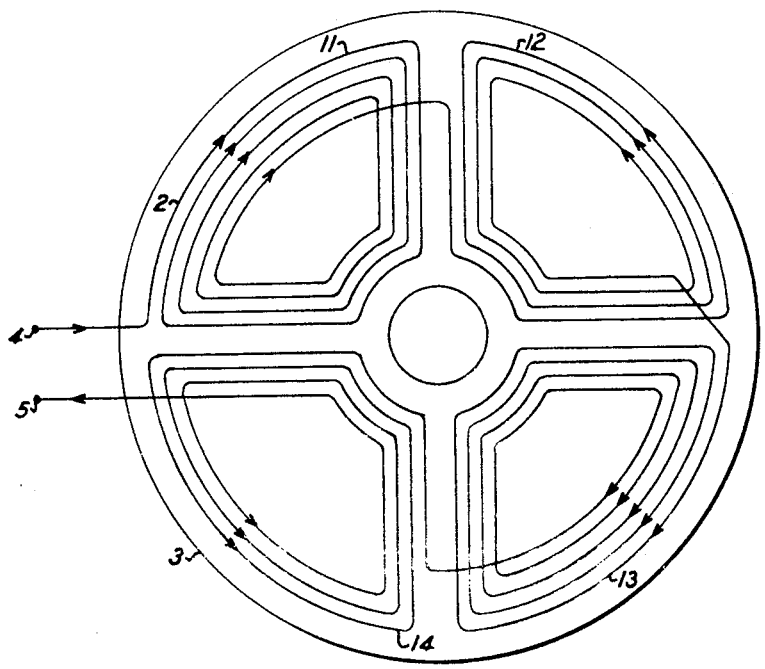
FIG. 1 is a schematic representation of an armature phase.
Figure 7:
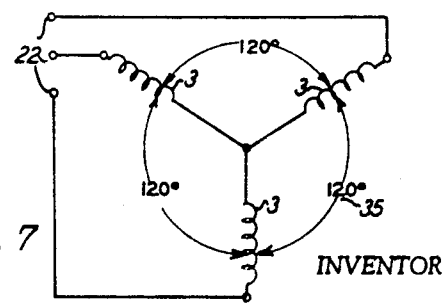
FIG. 7 is a schematic representation showing the interconnection of the three-phase windings.

FIG. 1 shows one phase of four aluminum foil coils. Each disc is comprised of such coils wound in or on a suitable strong nonconducting material such as glass fiber filled epoxy, and an input lead 4 and an output lead 5. The arrows signify the direction in which the coils are wound and also the direction of the current. It will be noted that no two coils in succession are wound in the same direction. For example, coils 11 and 13 are wound clockwise as shown in FIG. 1 and coils 12 and 14 are wound counterclockwise. Interconnection between coils is accomplished by means of any appropriate conductor such as copper, wire, as will be appreciated by those skilled in the art. In this and all circuits shown herein, damping by double windings with a crossover or other suitable means may be employed—particularly where the circuits are superconducting. Another method to obtain damping with the foil strip conductors is by copper plating same. In a three-phase generator or motor, three of these discs such as shown in FIG. 1 are placed closely side by side with common center of rotation displaced 120 electrical degrees from each other. FIG. 7 shows a Y connected armature, where each of the discs 3 constitutes armature windings. The 120° arcs designated 35 are, it is to be understood, electrical degrees and not mechanical degrees. It should be pointed out that it is not necessary to have four field coil sets to complete the generator. For, in practice, any number of field coil sets up to four may be used depending upon the requirements and convenience.

Figure 2:
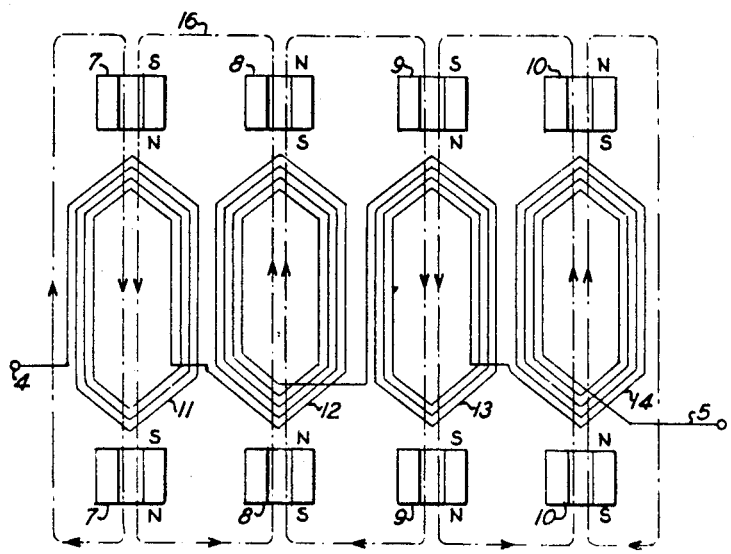
FIG. 2 is a schematic representation of one phase of the magnetic field with the armature phase of FIG. 1.

In FIG. 2, a further schematic drawing shows one phase of the armature winding of the field coil circuit. For convenience in the illustration, the armature field coils are drawn flat on the paper. Actually, however, the armature coils should be normal to the magnetic field flux which is shown also in the plane of the paper. Reference numerals 11, 12, 13 and 14 refer to the armature coils which are the same coils as are included in disc 3 shown in FIG. 1. Reference numerals 7, 8, 9 and 10 designate the field coil sets which each produce a strong magnetic field for the armature conductors. The field coil sets 7, 8, 9 and 10 are stationary and the armature coils 11, 12, 13 and 14 rotate mechanically through the magnetic fields to generate a voltage in the armature windings. It will be understood that many mechanical and circuit arrangements are possible which will result in the generating voltage in the armature windings or, in motors, in the production of mechanical power at the shaft.

Figure 3:
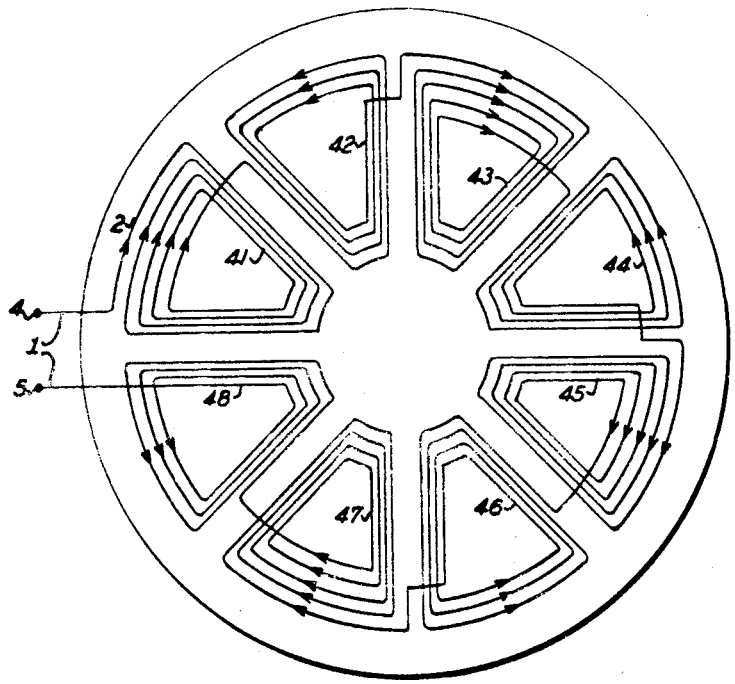
FIG. 3 is a schematic representation similar to that shown in FIG. 1 but with the frequency doubled.
Figure 4:
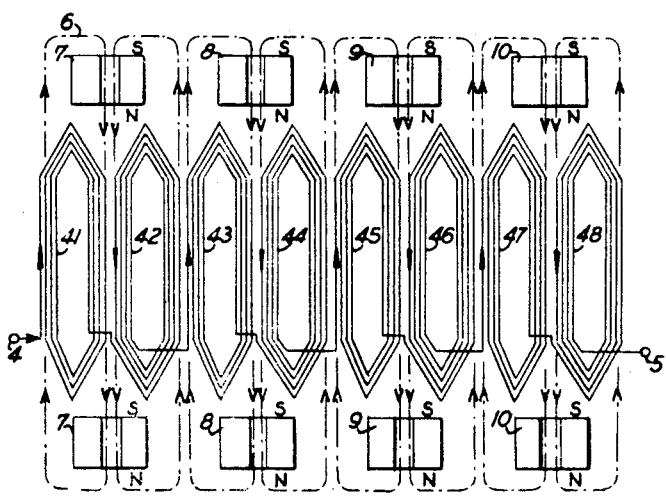
FIG. 4 is a schematic representation similar to FIG. 2 for the armature phase shown in FIG. 3.

In FIGS. 3 and 4 are shown a preferred superconducting motor or generator embodiment in which twice the frequency is utilized or generated over that arrangement of FIGS. 1 and 2 with a substantial reduction in size and weight. Reference numerals 41, 42, 43, 44, 45, 46, 47 and 48 designate the armature coils which are arranged as indicated in FIG. 3. This is, of course, a single phase of the armature winding and three windings properly spaced with reference to electrical degrees, as shown schematically in FIG. 7, will provide a three-phase output. The field coil sets which may be the same as shown in FIG. 2, are stationary and the armature coils rotate mechanically through the magnetic fields to generate a voltage in the armature windings. Again, many known mechanical and circuit arrangements are adaptable to generate a voltage in the armature windings or to provide mechanical power from a motor. The plane of the armature windings is maintained normal to the lines of flux, or very nearly so.

Figure 5:
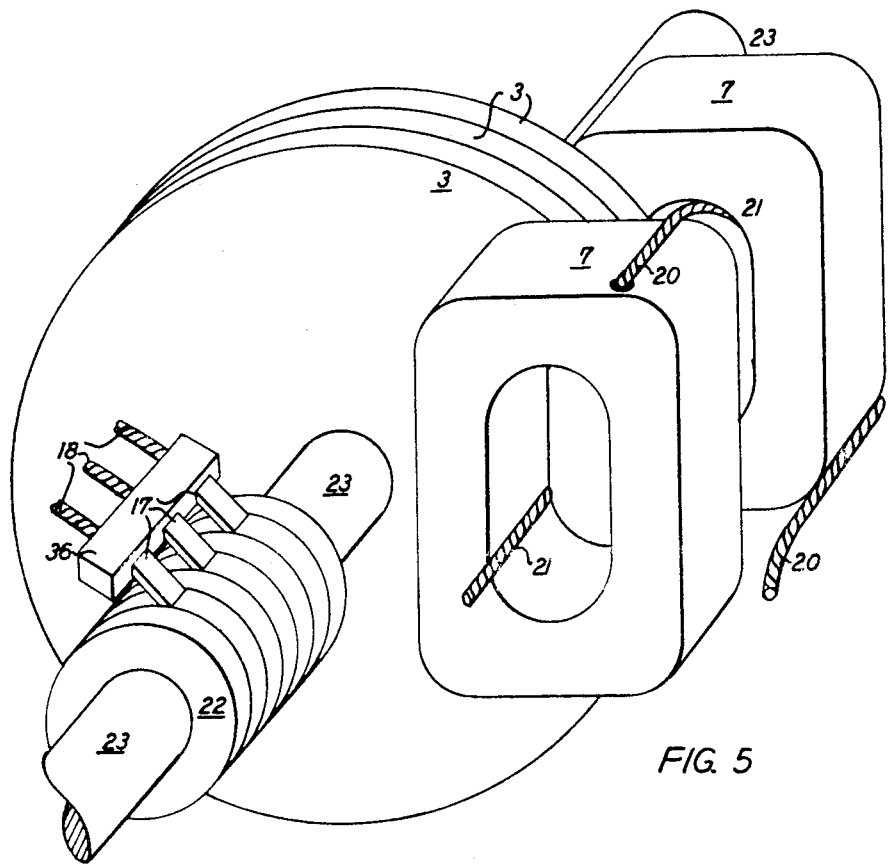
FIG. 5 is a perspective view of the apparatus in accordance with the invention showing the arrangement of one field coil, slip rings, current collectors, and electrical output leads.

FIG. 5 shows a perspective view of the more general embodiments of the superconducting generator. Reference numeral 18 designates three-phase alternating current output leads. Reference numeral 17 designates the current collectors, which are carried by a current collector holder 36. A slip ring assembly 22 is fixed on a shaft 23. Reference numeral 7 designates one of the superconducting coil with 20 and 21 being interconnections between superconducting coils. In fact, four such coils are distributed around the shaft 23. The armature coil assembly is made up of three discs 3, secured to the shaft 23.

Figure 6:
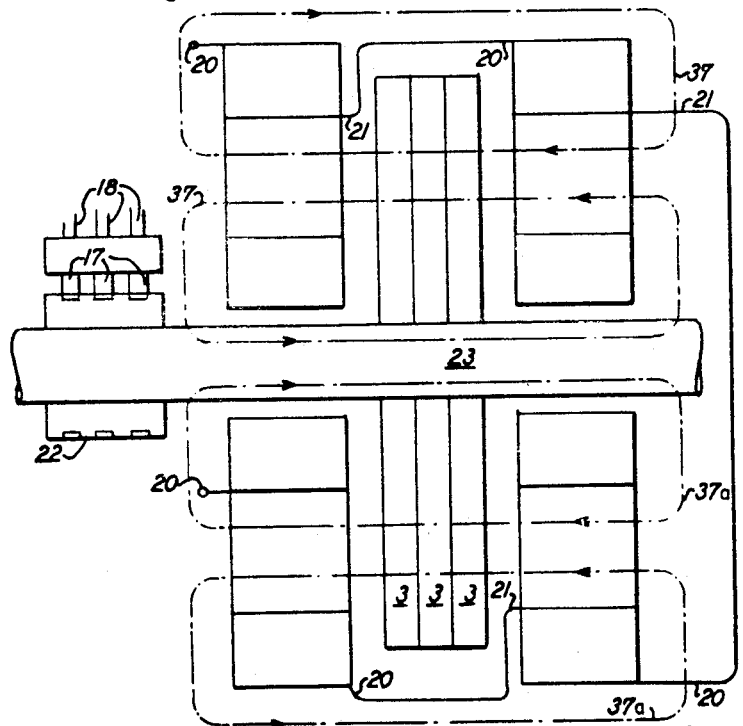
FIG. 6 is a diagrammatic sectional view of the apparatus shown in FIG. 5 illustrating the direction of magnetic flux.

FIG. 6 is a diagrammatic cross section of the superconducting generator. The dotted lines indicate lines of flux 37a which must be mechanically cut by the armature coils to generate a voltage.

As previously noted, FIG. 7 is a schematic drawing in which reference numeral 3 refers to the armature coils in each disc arrangement. The particular arrangement shown is a three-phase Y-connected winding. However, as will be understood by those skilled in the art, many different types of windings connections are possible.

Figure 8:
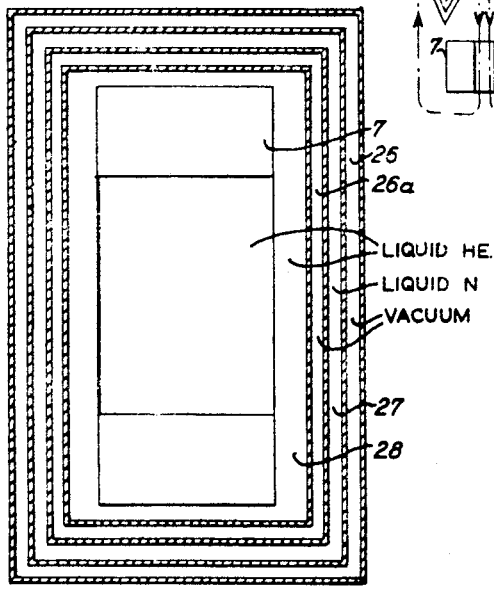
FIG. 8 is a diagrammatic illustration of a thermal enclosure to maintain the coils below the superconducting transient temperatures.

In FIG. 8 is shown a dewar thermal enclosure for a superconducting coil in accordance with the invention. First, within the enclosure is a vacuum space 26. Next, within the enclosure is a liquid nitrogen 27 shield which has inboard thereof a further vacuum space 26a surrounding liquid helium contained in the central space 28. The thermal enclosure shown is a practical and preferred embodiment, but other types of thermal insulation may be utilized such as multiple layer insulation which have alternating layers of reflecting materials, for example aluminum foil with a separating medium such as glass cloth, or such as crumpled mylar with aluminum deposition spirally wound in a vacuum enclosure.

Figure 9:
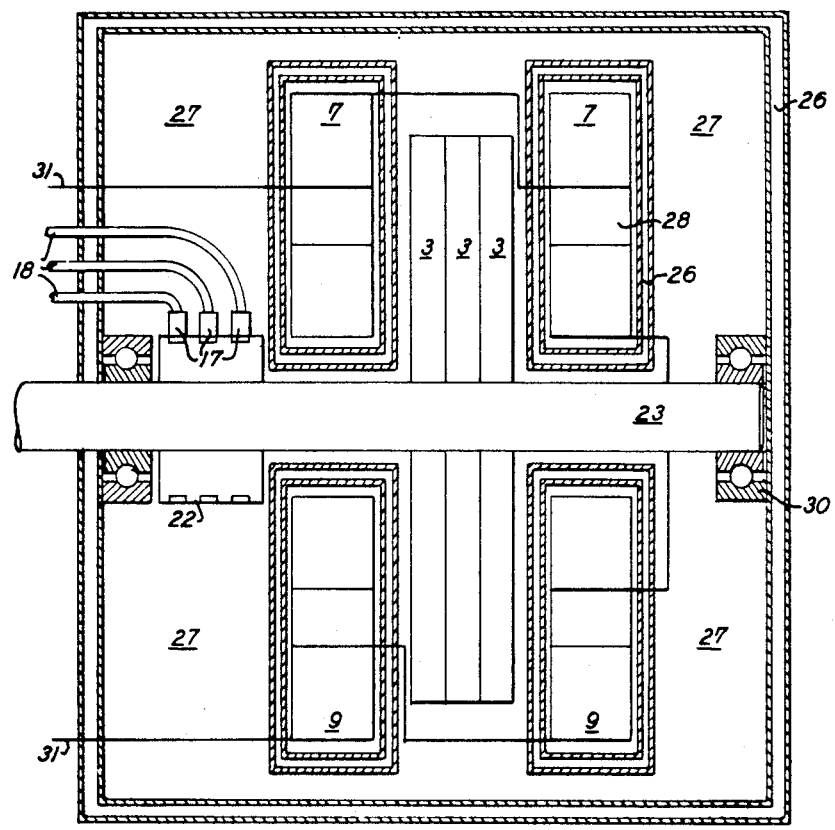
FIG. 9 is a diagrammatic sectional view of a superconducting generator where the rotor is also cooled by cryogenic fluids.

An embodiment of a superconducting generator in which the armature windings are cooled in a cryogenic liquid such as nitrogen 27 is shown in FIG. 9. In this embodiment, a larger power capacity is obtainable from the rotor armature where it is cooled with cryogenic liquid as shown.

If the liquid nitrogen 27, as shown in FIG. 9, be replaced by liquid hydrogen under a vacuum, the transition temperature surrounding the rotoring armature is dropped below the critical temperature of niobium-tin or certain other superconductor materials whereby the armature is rendered superconducting. More specifically, since the critical temperature of niobium-tin is 18° Kelvin, by placing liquid hydrogen under a vacuum it is possible to lower the temperature of liquid hydrogen to about 14° Kelvin and render niobium-tin coils superconducting. It will, however, be appreciated that by regulation of the vacuum, the liquid hydrogen should be maintained above its freezing point. Thus, it may be understood that by employing my various techniques, such as regulating the pressure of a cryogenic liquid, it is possible to maintain it at an appropriately useful temperature for superconducting elements.

Figure 10:
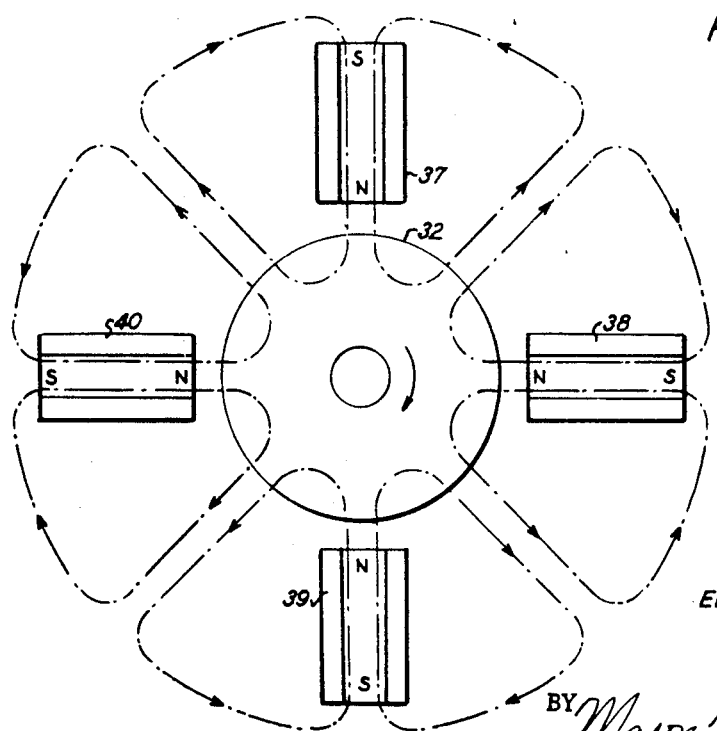
FIG. 10 is a diagrammatic sectional view of apparatus in accordance with the invention wherein a cylindrical rotor is employed between the windings.

The theory of a complete superconducting generator, where both the field and armature windings are superconducting, is that the armature coils will generate a higher current at a lower voltage. This is advantageous for certain applications, such as in the chemical field where high current with relatively low voltage may be utilized. Other mechanical arrangements to achieve useful superconducting generators and motors are shown in FIGS. 10 and 11. These Figures are schematic diagrams of armature and field coil arrangements. The superconducting field windings 37, 38, 39 and 40 are stationary in both cases. The armature conductor cylinders 3a and 3b rotate through the magnet fields produced by superconducting field windings 37, 38, 39 and 40. In the arrangement shown in FIG. 11, the fields are much easier to insulate thermally from the rotating armature. The superconducting coils are arranged and connected so that the four superconducting coils produce an eight-pole generator which can be rotated at one-half the rotational speed of the four-pole generator to obtain the same power. This arrangement produces power more efficiently than if the superconducting coils were arranged in a different polarity, for example, if the polarities of coils 38 and 40 were reversed. It is to be appreciated that in FIGS. 10 and 11, the armature coils are arranged about the perimeter of a cylinder instead of a disc as described with reference to FIGS. 1, 2, 3 and 4. With such arrangement, it is possible to provide both interior and exteriorly arranged cylinders.

As previously indicated, it is preferred that the windings in this case be composed of foil as contrasted with wire. Strips of such foil can be very thin—usually several thousandths of an inch and insulation, such as one-fourth mil kraft paper, is generally sufficient. An advantage of foil strips is that each turn has lateral radiated edges which are exposed to the cooling medium and thus effective heat dissipation is provided. Temperatures between adjacent layers are maintained uniform with hot spots, inherent in conventional windings, being eliminated. It is preferred that the windings in disc 3 be aluminum alloys of types known in the art, which have been developed for use as material for strip windings. Since aluminum is a superconductor at sufficiently reduced temperatures, such windings may also be used in the superconducting field coils. However, in the present state of the art, intermetallic niobium-tin ($Nb_4Sn$) is preferred for the field coils. The foils may be disposed either normal to the plane of a disc 3 or parallel to same. An example of structure which may be utilized effectively where the foil strips have their planes parallel to the plane of the disc 15 is shown in FIG. 12. Thus, we may see that the coil 11, for example, is supported by a plurality of vanes 50. The vanes 50 act to circulate air around the edges of the strip foils making up the coil 11. The edges of each of the foils are thus cooled to achieve uniform cooling of the entire coil 11. It will be appreciated, of course, that the same construction may be used if the foil coils had their planes normal to the plane of the disc 3.

FIG. 13 shows a cross section taken on section lines XIII—XIII of FIG. 12. It will be noted in FIG. 13 that the foil coil 11 has a parallelogram cross section with unequal angles in the corner. Such construction increases the exposure of the individual foil strips at their edges and thus tends to promote even better cooling. It will also be noted that the air path through the outer row of vanes 50 is opposite to that produced in the inner row so that lateral forces due to the propeller effect of the vanes is balanced.

An alternative method of winding disc 3 similar to that shown in FIG. 1 is illustrated in FIG. 14. The windings designated 51 comprise foil strips which are normal to the plane of the disc 3. However, as is shown in FIG. 15, where such strips cross, they are given a half-twist whereby they may cross within the thickness of disc 3 which will generally be the same width as that of the foil strips 51. Referring to FIG. 15, it will be noted that the strips 51 may be divided in two or more bunches, such as 51a and 51b, in order to facilitate the crossing of strips in the event that the combined thickness of the strips does not permit the strips to pass each other conveniently in a single bunch. It will be noted that the coils 11a and 13a in FIG. 14 are formed in one pattern which appears to be more or less dumbbell in shape as seen in plan view and that the strips 12a and 14a are similarly disposed. The winding is the equivalent of four coils as shown in FIG. 1. It will be appreciated by those skilled in the art that eight or any number of coils, which is a multiple of four, may be similarly provided using essentially the same pattern.

FIG. 16 shows a further method of winding the foil strips designated therein 54 so as to avoid crossing of strips. It will be seen in FIG. 16 that only one crossing at location 55 is necessary. Alternate North-South poles are provided about the disc depending upon the direction of current through the foil strip 54. In order to maintain the density of the magnetic flux constant in the plane of the disc, the angles designated by reference numerals 56 are somewhat smaller than the angles designated by reference numerals 57. For example, angle 56 may be 55° whereas angle 57 may be 65°. The exact angle and configuration of coils, such as shown in FIG. 16, is, however, a matter of design so as to provide that lateral forces on discs 3 are not unbalanced.

FIG. 17 shows armature windings which may be employed with a cylindrical armature, such as armature 3a or 3b. Here the foil strips 60 are set out in a scalloped form. Such windings are endless and no crossings are required. With alternating current, North and South magnetic lines of flux are created about each foil strip portion 60a. Windings, such as shown in FIG. 17, would normally be with the foil strips radially disposed so that their planes are normal to the surface of the cylinder 3a. However, if desired, the same can be disposed parallel to the surface of the cylinder 3a in which case 90° turns can be effected as shown in FIG. 18 before strip 61. Since the thickness of each individual foil strip is doubled at the corners 62, it may be desirable to have the corners at two or more locations as indicated in the FIGURE. However, since a thicker flange portion of the rim may not be considered undesirable, it may be advantageous to locate all of the corners 62 near the edge, which will be a thicker flanged portion of the cylinder 3a. To minimize the corners, such as corners 62 where the strip is carried parallel to the surface of the cylinder 3a, a construction such as shown in the fragmentary view in FIG. 19 may be employed wherein the foil strip 64 is zigzagged across the cylinder 3a.

For a field coil winding, FIG. 20 shows a winding for coils comparable to those shown in FIG. 4 wherein the adjacent coils have adjacent North and South pole dispositions. It will be noted that the foil strips designated generally 65 are undulated so as to provide alternate North and South poles. With such a pattern disposed about a cylinder, as shown in FIGS. 10 and 11, it will be appreciated that the foil strips 65 may be endless without the necessity to cross itself. Thus, the current may enter at 66 and continue through the coil strip 65 to point 67 where it enters the second tier of foil strips and continues to point 68 where it enters the third tier of strips. At point 70, the strip turns in the opposite direction and goes to point 71 where it enters the second tier and to point 72 where it enters the third or outer tier from whence it is taken by the outlet connection 73. This embodiment presupposes that the strips 65 are normal to the surface of the cylinders 3a and 3b. However, the strip 65 may be placed in a parallel arrangement in which case the same arrangement is used except that the tiers are piled one on the other. With the field coils in a cryogenic environment, this latter type of winding is preferable in that the low temperature fluid can be made to flow around the coils in a manner whereby maximum heat transference between the foil strips and the cryogenic fluid is effected. For a disc, such as shown in FIG. 1, the winding of the field coils may be as shown in FIGS. 14 or 16. Here again, however, with a cryogenic environment, it is preferable that the edges be exposed to the cryogenic fluid. To the extent that a proximity of the field coil windings to the armature coil windings is desirable, such can be most advantageously effected with a winding as shown in FIG. 14 with the foil strips parallel to the plane of a carrier member analogous to the disc 3. Otherwise, for mechanical reasons, it may be advantageous to dispose the foil strips normal to such carrier member.

FIG. 21 shows an electrical apparatus employing foil coils which may be either a generator or synchronous motor. The field coils 74 are disposed in a manner similar to that shown in FIG. 10 within a torus container 75. The torus container is a dewar thermal enclosure similar to that shown in FIG. 8 wherein liquid helium is surrounded by liquid nitrogen with intervening vacuum spaces. It is not shown as such in FIG. 21 for the purposes of clarity. The winding of field coil 74 is similar to that shown in FIG. 20. The armature windings are disposed upon a spider member 76, which is affixed to the shaft 77. It will be noted that the spider member 76 includes a half-torus-shaped portion 80 which surrounds on three sides the torus container 75. The disposition of the armature windings is shown in FIG. 22 wherein the foil strip 81 is secured to the surface of the spider member 76 in such a way as to create a polarity on each side of the torus portion 80 corresponding to the polarity formed by the direct current within the field coils 74. Thus, as is well known in the art, with an alternating current applied to the armature of foil strips 81, the shaft 77 is caused to rotate. In a similar manner, rotation of the shaft 77 creates an alternating current in the armature strips 71.

FIG. 23 shows a power conversion unit 84 whereby power supplied to shaft 81 is transferred to shaft 82. The power conversion unit 84 has a generator part 85 and a motor part 86. Each of these units is essentially the same as the apparatus shown in FIGS. 21 and 22. Strip foil is to be used and the windings on the corresponding spider members corresponds generally to that utilized for three-phase alternating-current-generating and synchronous motors. The circuits are connected through a switch 87 which gathers electrical energy from conventional current collectors or the like. The spider members for parts 85 and 86 rotate about a combined field coil space 90. The field coil space is contained within a dewar thermal enclosure such as shown in FIG. 8 and, in this embodiment, a vacuum source connection 91, a helium liquid connection 92, and a liquid nitrogen connection 94 are shown. FIG. 24 shows diagrammatically how these connections are effected. The connections have, however, been offset for the purposes of clarity. The field coils are held on a continuous disc member 95 and the outer edges of parts 85 and 86 rotate within the vicinity of such disc. Interposed between such edges and the disc is a labyrinth seal 96 whereby the interior between the generator part 85 and motor part 86 may be maintained at a substantially high vacuum.

The armature coils 100 (one phase) in the generator side of the field coil space are so disposed to give a desired frequency per revolution of the shaft 81. In contrast, the armature coils 101 (one phase) on the motor part of the unit are so spaced to give a substantially reduced rotational speed to the shaft 82. A similar coil arrangement may be used for the field coils. In such event, within the container and disposed between the coils a baffle member 102 is located to divide the flow of liquid helium into the vicinity of each of the strip foils so as to promote maximum cooling of same when the device is operated. It will be appreciated that this construction places the superconducting thermal enclosure into a minimal space which serves both for the purposes of the generator and motor. Apart from other efficiencies and advantages, this permits a considerable savings in space and weight.

FIG. 26 shows a simple schematic drawing of a practical application of the devices of this invention. Either the generator or the motor, as shown, may employ superconducting coils. The direct current source may be batteries or may be a suitable direct-current generator. By recirculation of the cryogenic fluids, they may be further refrigerated and cooled by any appropriate means known in the art. For devices which are intended to run for only relatively short periods of time, the cryogenic fluids may be merely placed within the thermal enclosure and refilled from external sources as necessary.

Figure 27:
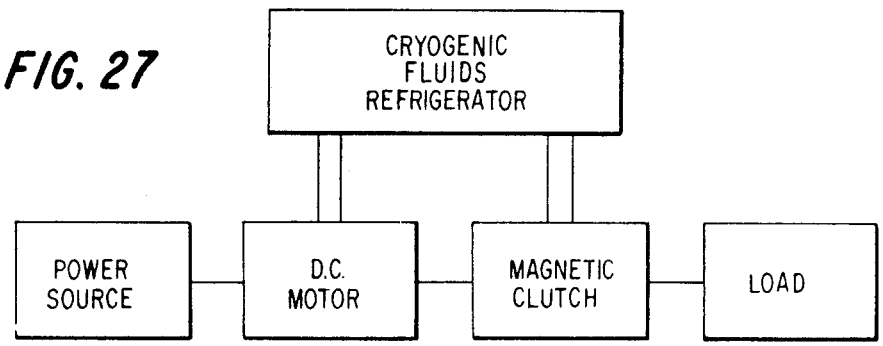
FIG. 27 is a schematic representation of a further power plant which utilizes the invention.

FIG. 27 is a further schematic drawing of a practical application of the devices of the instant invention. Either the direct-current motor or the magnetic clutch, or preferably both, utilize stationary superconducting coils and a rotating electrical element which are both cooled through coolants from the common cryogenic fluids refrigerator. The magnetic clutch, as shown in more detail in FIG. 28, couples a torque input shaft 104 and a torque outlet shaft 105, both being received and supported by cantilever bearings 106 which also provide support for the components of the clutch contained within the housing 107. It will be noted that housing 107 has inner and outer shells 110 and 111 separated by an evacuated space 112 which is connected through conduit 114 to a vacuum pump or appropriate vacuum source. Housing 107, within the inner shell 111, is filled with liquid nitrogen which has been cooled by a cryogenic fluid refrigerator and circulated through housing 107 via conduits 115. Affixed to shaft 105 within housing 107 is an eddy current induction drum 116 which is composed of copper or other suitable conductive material. Drum 116 includes an annular portion 117 which is received within the annular space 120 of a conventional-type magnetic iron circuit member 121 which is affixed within the housing 107 to the input shaft 104. A superconducting coil 122 is contained within a ring-shaped enclosure 124 which includes inner and outer shells 125 and 126 separated by an evacuated space 127. Space 127 is interconnected to the vacuum source through a conduit 130 in member 121 and shaft 104 which leads to a collection ring 131 which in turn is connected through conduit 132 to a vacuum source. The inner shell 126, which carries coil 122, is filled with liquid helium which is recirculated through the cryogenic fluid refrigerator via conduits 134 and 135 within member 121 and shaft 104 which connect with conduits 136 and 137 leading to a cryogenic fluid refrigerator through small collector rings 140 and 141 encircling shaft 104 within the larger collector ring 131; circulation being assisted by the centrifugal force action of shaft 104. The dash lines indicate lines of magnetic flux 142 which cut through the annular portion 117, the path of the magnetic flux 142 being determined by the magnetic iron circuit member 121 and coil 122.

Figure 32:
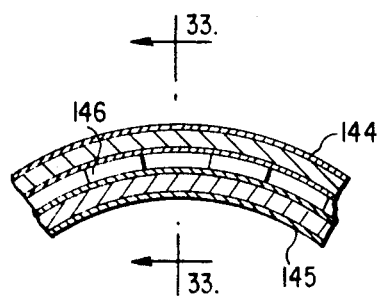
FIG. 32 is a fragmentary side view of two conductive strips of a superconductive magnetic field producing coil.
Figure 33:
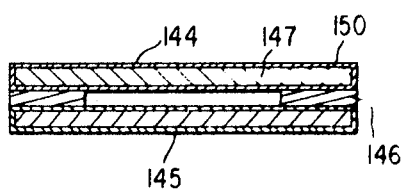
FIG. 33 is a sectional view taken on lines 33—33 of FIG. 32.

Coil 122 is preferably composed of strips of a suitable superconductor such as niobium tin ($Nb_4Sn$). Also such strips are preferably spaced apart a sufficient distance to permit cooling by the helium coolant on all sides of each strip. This may be seen by reference to FIGS. 32 and 33 wherein strips 144 and 145 of coil 122 are separated by spacers 146. Each strip is composed of a foil 147 of a homogenous niobium tin surrounded by a thin layer 150 of a conductive material such as aluminum. The spacers 146 are preferably composed of insulating material. When the strips 144 and 145 are cooled by the surrounding liquid helium to below their superconductive transition temperature, the niobium tin portion of the strip 147 becomes superconducting. The aluminum coating 150, however, does not necessarily become superconducting, although its conductivity is improved, but it functions to assist in damping transient voltages which may arise within the superconducting foil 147. Drum 116, although immersed in liquid nitrogen, is not rendered superconductive, but its conductivity is materially improved at the cryogenic temperatures of liquid nitrogen. In addition, any heat generated in drum 116 is rapidly dissipated by the cooling effect of the surrounding liquid nitrogen in housing 107.

In operation, the torque input shaft 104 is brought up to speed, the nitrogen and helium coolants are circulated in the housing 107 and enclosure 124 whereby the coil 122 is rendered superconducting and electric current is gradually increased in coil 122 which causes a slow buildup in the magnetic flux through the magnetic iron circuit member 121. Due to the relative rotation of the magnetic field member (made up of the member 121 and coil 122) the magnetic flux is moved relative to the inductor causing eddy currents to be induced therein. These induced eddy currents develop a second magnetic field which produces a relative torque between the members, the strength of which is determined directly by the strength of the primary field and the speed differential between the two members. The speed differential, known as slip, is considerably minimized with a strong magnetic field. Thus, at operating speeds, shaft 105 is turned approximately the same speed as shaft 104. By securing shaft 104 the apparatus becomes a magnetic brake which can be applied in a smooth manner by slowly increasing the current within coil 122. However, by rapidly increasing the current within coil 122 to full strength with shaft 104 secured, an emergency stop can be obtained. It will be appreciated that the liquid nitrogen within the housing 107 serves a dual purpose; that is, as a coolant for the drum 116 and also, to provide an intermediate cryogenic media for the liquid helium within the enclosure 124 whereby loss of the expensive liquid helium is minimized.

The transmission system disclosed in FIG. 27 is advantageous in that the speed may be controlled by the DC motor and the load is smoothly shifted under various speed and torque conditions by the magnetic clutch.

FIG. 29 illustrates a somewhat more complex power transmission system which utilizes a common cryogenic fluid refrigerator for various electrical components. FIGS. 30 and 31 disclose magnetic brakes which may be employed in similar systems. The magnetic brake shown in FIG. 30 is suitable for direct application either to a driving means or to the member being driven. A conventional magnetic iron circuit member 150 is anchored in a foundation 151. An annular space 152 in member 150 receives a housing 154 which has an outer shell 155 and an inner shell 156, there being an evacuated space 157 between shells 155 and 156. The interior of housing 154 is filled with liquid nitrogen which it receives via conduit 160 from the cryogenic fluid refrigerator. Also received in housing 154 is an eddy current inductor drum 161, composed of copper or other suitable conductive material, which is affixed to shaft 162.

Cantilever bearings 164 supported by the foundation 151 or other suitable support means provide rotatable support for the shaft 162 and drum 161. Drum 161 includes an annular portion 165. In annular space 152, also in housing 154, a ring enclosure 166 is provided for the superconducting coil 167. Enclosure 166 comprises an outer shell 170, an inner shell 171 and an evacuated space 172 therebetween. The superconducting coil 167 is mounted within the inner shell 171 and is immersed in liquid helium which is contained within the shell 171. The liquid helium connects with the cryogenic fluid refrigerator through a conduit 174. The evacuated spaces 157 and 172 connect with a suitable vacuum pump or other vacuum source through conduits 175 and 176 respectively. The coil 167 together with the magnetic iron circuit member 150 comprise a field member which provides a magnetic flux 177, shown by dash lines, received through the annular portion 165 of drum 161.

Figure 28:
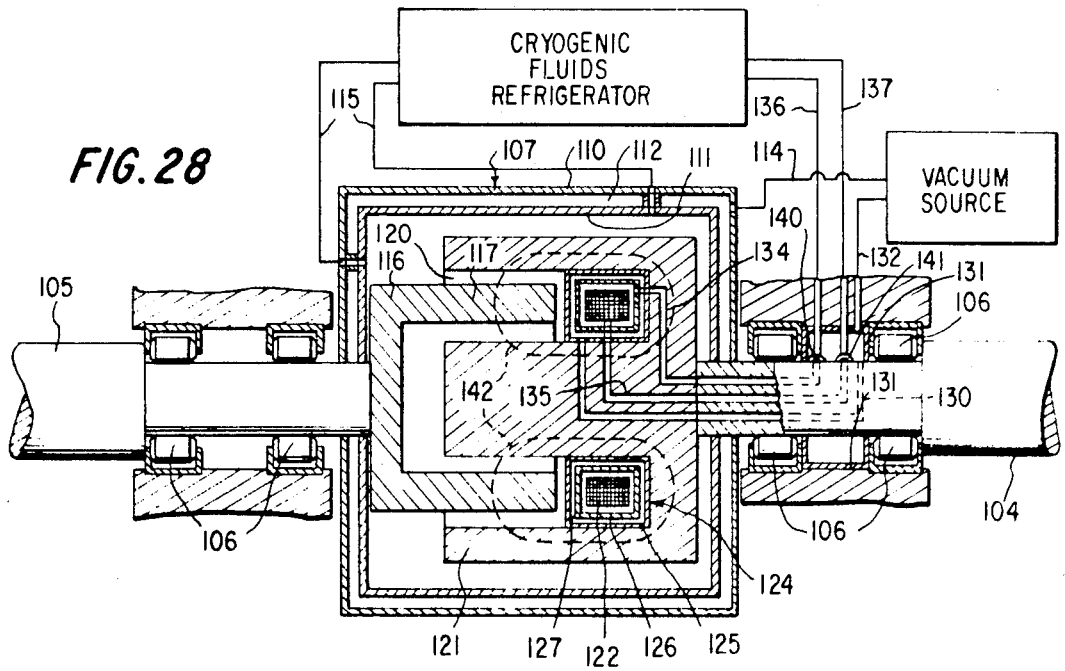
FIG. 28 is a diagrammatic sectional view showing a magnetic clutch which includes a superconductive magnetic field producing coil.

In operation, torque on the shaft 162 is braked by the application of current to the superconducting coil 167 which induces eddy currents and magnetic flux in the drum 161 in the same manner as described with reference to FIG. 28. Liquid nitrogen in the housing 154 serves both to cool the drum 161 and as an intermediate cooling medium for the enclosure 166 and the liquid helium contained therein. By adjusting the current in the superconducting coil 167, the braking can be effected either very rapidly or slowly.

Referring now to FIG. 31, a load shaft 180 is surrounded by a torus-shaped frame 181 which is secured to and supported by a foundation member 182. Frame 181 has mounted within it a donut-shaped magnetic iron circuit member 184 which includes an annular space 185. A housing 186 supported by the member 184 is comprised of an inner shell 187, an outer shell 190 and an evacuated space 191. The shaft 180 engages shells 187 and 190 in a sealing engagement. The evacuated space 191 is connected through conduit 192 to a vacuum pump or other appropriate vacuum source. The interior of housing 186 is filled with liquid nitrogen which is cooled by a cryogenic fluid refrigerator connected thereto through conduit 194. A ring-shaped enclosure 195 comprised of an inner shell 196, an outer shell 197, and, between the shells, an evacuated space 200 which connects through conduit 201 to a vacuum source. A coil 202 is mounted within the inner shell 196 of enclosure 195. The enclosure 195 is filled, within the inner shell 196, with liquid helium which is circulated from a cryogenic fluid refrigerator via conduit 204. The coil 202, together with the magnetic iron circuit member 184, comprise a field member which creates a magnetic field having a flux path 205, shown in dash lines, which intercepts a disc-type eddy current inductor drum 206 affixed to rotate with the shaft 180.

As with the embodiment disclosed in FIG. 30, the shaft 180 can be braked rapidly or slowly depending upon the current supplied to the coil 202. In both of these embodiments it will be understood that the coils 167 and 202 have the same structure as coil 122 disclosed in more detail in FIG. 28. The liquid nitrogen coolant of FIG. 31 serves the dual purpose of cooling the drum 206 and acting as intermediate cooling medium for the enclosure 195.

Components which are conventional and generally widely known in the field to which the invention pertains have not been described in detail since their exact nature or type is not necessary for an understanding and use of the invention by persons skilled in the art. However, for a more thorough understanding of the theory and dynamics of superconducting devices, attention is invited to the following publications:

*Superconducting Power Generators*, Ground Support Equipment, Third Quarter 1964, E. Halas 1967 *Superconductivity Conference Abstracts*, W. H. Hardwig, The University of Texas at Austin, Nov. 6–8, 1967.

Having thus described my invention, what I claim as new and desire to secure by Letters Patent of the United States is:

1. An electrical transmission system for mechanical power which comprises a mechanical power source, an alternating-current generator driven by said power source, an alternating-current synchronous motor driven by said generator, stationary magnetic-flux-producing means including a direct-current coil for said generator and said motor, said magnetic-flux-producing means being in a single enclosure, said enclosure containing a liquid coolant adapted to cool said coil means to a state of superconductivity, and refrigeration means coupled with said enclosure for cooling, circulating and storing said coolant.

2. An electrical transmission system in accordance with claim 1 wherein said enclosure is substantial torus-shaped and is disposed between said generator and said motor.

3. An electrical transmission system in accordance with claim 1 wherein said coil means comprise two sets, a first set for said generator and a second set for said motor, there being more magnetic flux fields produced by said second set than by said first set.

4. An electrical transmission system in accordance with claim 1 wherein said coil means comprise undulated strips.

5. An electrical transmission system in accordance with claim 4 wherein each of said strips is exposed to said coolant on at least one of its surfaces.

6. An electrical transmission system in accordance with claim 5 wherein said strips are spaced apart whereby said coolant circulates therebetween.

7. An eddy current coupling device which comprises a housing, a rotatable inductor drum in said housing, a field member in said housing associated with said drum and providing an interlinking magnetic flux therewith, said field member including a coil, an enclosure in said housing with said coil being mounted therein, first and second liquid coolants, the first of said coolants disposed in said enclosure and adapted to cool said coil to superconductivity, the second of said coolants adapted to cool said drum to a cryogenic temperature range, said second coolant being confined in said housing, a cryogenic fluid refrigerator and conduits connecting said refrigerator with said first coolant in said enclosure and said second coolant in said housing.

8. An eddy current coupling device in accordance with claim 7 wherein said enclosure is torus-shaped.

9. An eddy current coupling device in accordance with claim 7 wherein said coil comprises strips.

10. An eddy current coupling device in accordance with claim 9 wherein each of said strips is exposed to said first coolant on at least one of its surfaces.

11. An eddy current coupling device in accordance with claim 10 wherein said strips are spaced apart whereby said first coolant circulates therebetween.

12. An eddy current braking device which comprises a housing, a stationary enclosure in said housing, a coil mounted in said enclosure for producing a magnetic field, a stationary field member mounted in said housing providing a path for magnetic flux produced by said coil, a rotatable shaft received in said housing, an induction drum in said housing affixed to said shaft and situated to receive the magnetic flux produced by said coil, first and second liquid coolants, the first of said coolants surrounding said coil within said enclosure and adapted to cool said coil to superconductivity, the second of said coolants surrounding said drum and being confined within said housing, said second coolant adapted to cool said drum to a cryogenic temperature range, a cryogenic fluids refrigerator, and conduits connecting said refrigerator with said first coolant in said enclosure and said second coolant in said housing.

13. An eddy current braking device in accordance with claim 12 wherein said enclosure is torus-shaped.

14. An eddy current braking device in accordance with claim 13 wherein said enclosure surrounds said shaft.

15. An eddy current braking device in accordance with claim 12 wherein said coil is comprised of a conductor strip surrounded by said coolant.

16. In an electrical transmission system for mechanical power, a direct-current magnetic flux producing coil, said coil comprised of strips composed of material which becomes superconductive when cooled to its superconductive transition temperature, an enclosure, said coil mounted in said enclosure, a first coolant surrounding said coil adapted to cool said coil strips to at least their transition temperature, a rotating conductive member responsive to the magnetic flux produced by said coil, the conductivity of said rotating member being substantially increased when said rotating member is cooled to a predetermined cryogenic temperature range, a housing for said rotating conductive member, a second coolant within said housing surrounding said rotating member and cooling same to a temperature in said temperature range, and refrigeration means for said coolants.

17. Structure as claimed in claim 16 in a direct current motor and also in a magnetic clutch coupled thereto, there being a common refrigeration means for said motor and said motor.

18. Structure as claimed in claim 16 in an alternating-current generator, in a direct-current motor, and in a magnetic clutch, which together couple a mechanical power source with a load, there being a common refrigeration means for said generator, motor and clutch.

19. Structure as claimed in claim 17 which includes a cryogenically cooled magnetic brake, conduit means circulating coolants from said common refrigeration means through said brake.

20. A power conversion unit which comprises a magnetic-flux-producing means disposed in a ring, an electrical generator part including a half-torus part surrounding one-half of said magnetic-flux-producing means, a motor part including a further half-torus part surrounding another half of said magnetic flux producing means, an electrical generating circuit included in said first-mentioned half-torus part, electrical motor circuit means included in said further half-torus part, conductive means connecting said generating circuit and said motor circuit, and a switch in said conductive means, said magnetic-flux-producing means comprising field coils which are undulating foil strips.

21. The power conversion unit in accordance with claim 20 wherein said foil strips are composed of superconducting material, and including means for lowering the temperature of said foil strips to at least their superconducting transition temperatures.

22. The power conversion unit in accordance with claim 20 wherein the number of magnetic poles produced on one side of said field coils is greater than on the other side.